United States Patent [19]
Darrieux

[11] Patent Number: 5,350,615
[45] Date of Patent: Sep. 27, 1994

[54] METHOD AND DEVICE FOR PRODUCING REINFORCEMENT ELEMENTS FORMED OF RESISTANT FIBERS

[75] Inventor: Jean-Louis Darrieux, Medard-en-Jalles, France

[73] Assignee: Societe Nationale Industrielle et Aerospatiale, Paris, France

[21] Appl. No.: 48,080

[22] Filed: Apr. 14, 1993

Related U.S. Application Data

[60] Continuation of Ser. No. 788,587, Nov. 6, 1991, abandoned, which is a division of Ser. No. 646,094, Jan. 25, 1991, Pat. No. 5,095,833.

[30] Foreign Application Priority Data

Feb. 26, 1990 [FR] France ................. 90 02352

[51] Int. Cl.$^5$ .................. B32B 5/22; B32B 7/08; D05B 93/00
[52] U.S. Cl. .................. 428/102; 428/108; 428/113; 428/300; 428/902; 28/108; 112/412; 112/440
[58] Field of Search ............... 428/102, 108, 113, 902, 428/300; 264/103; 139/16, 22, 387 R, 408; 28/100, 108; 112/412, 440

[56] References Cited

U.S. PATENT DOCUMENTS

| | | | |
|---|---|---|---|
| 3,322,868 | 7/1963 | Kruse et al. | 428/295 |
| 3,488,250 | 1/1970 | Zocher | 28/108 |
| 3,950,587 | 4/1976 | Colijn et al. | 428/234 |
| 4,863,660 | 9/1989 | Cahuzac et al. | 264/103 |

Primary Examiner—George F. Lesmes
Assistant Examiner—Kathryne E. Shelborne
Attorney, Agent, or Firm—Marshall, O'Toole, Gerstein, Murray & Borun

[57] ABSTRACT

A method and device are disclosed for forming reinforcement element formed of fibers distributed along three dimensions, wherein, a continuous fiber is introduced in a substrate resting on a support formed of such fibers crossed in at least two directions, by stitching, from the free face of said substrate opposite said support by means of a needle driven with a reciprocal movement, a relative movement being in addition generated between said support and said needle so that said continuous fiber is formed inside said substrate of a succession of consecutive segments forming a zig-zag line.

The invention is remarkable in that:
said needle is curved and imposes on each segment of said continuous fiber a similar curved form; and
the reciprocal movement of said curved needle occurs while rotating about an axis perpendicular to the plane of said needle and disposed on the concave side thereof.

3 Claims, 8 Drawing Sheets

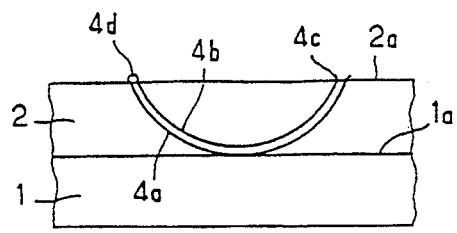
FIG.3a1
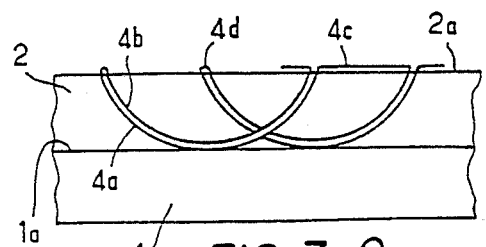
FIG.3a2
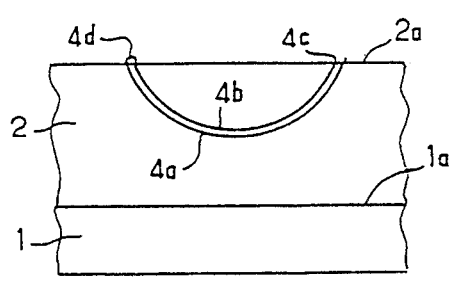
FIG.3b1
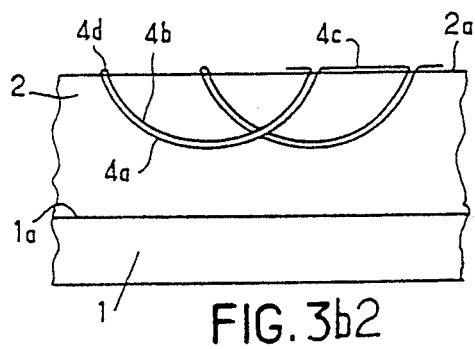
FIG.3b2
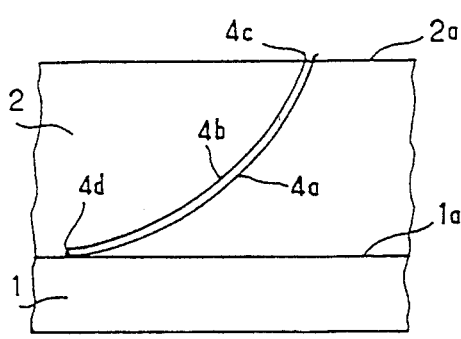
FIG.3c1
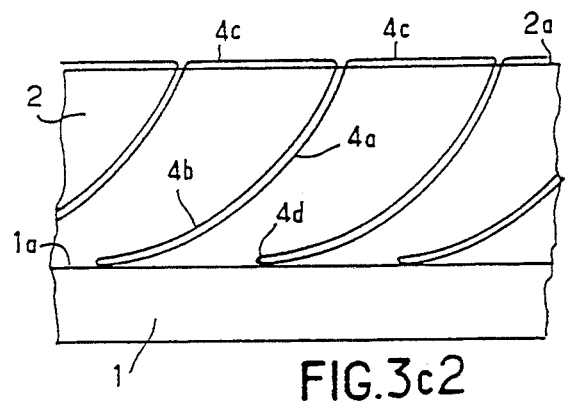
FIG.3c2
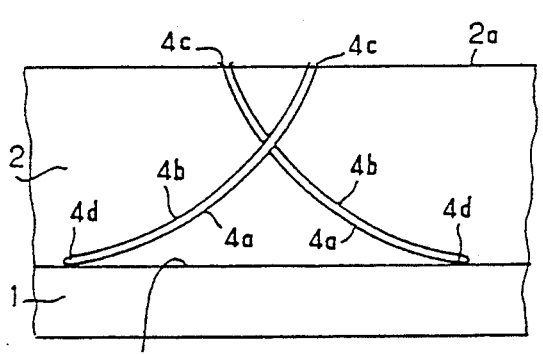
FIG.3d1
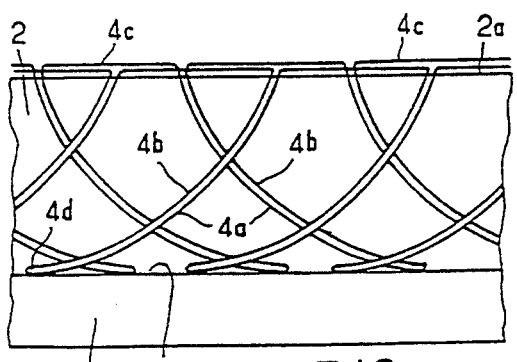
FIG.3d2

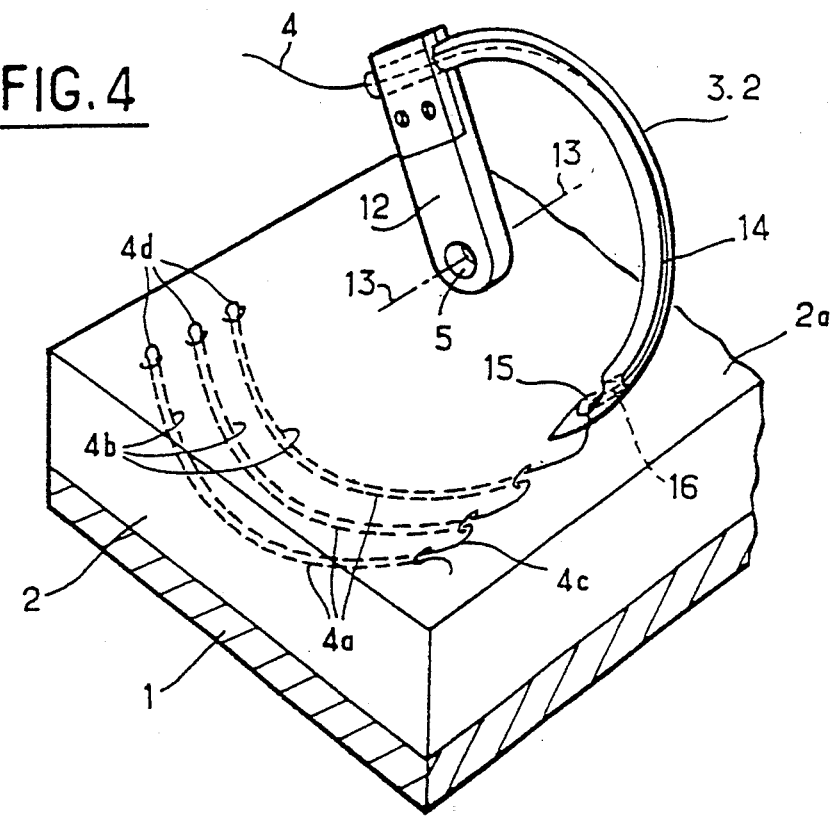
FIG. 4
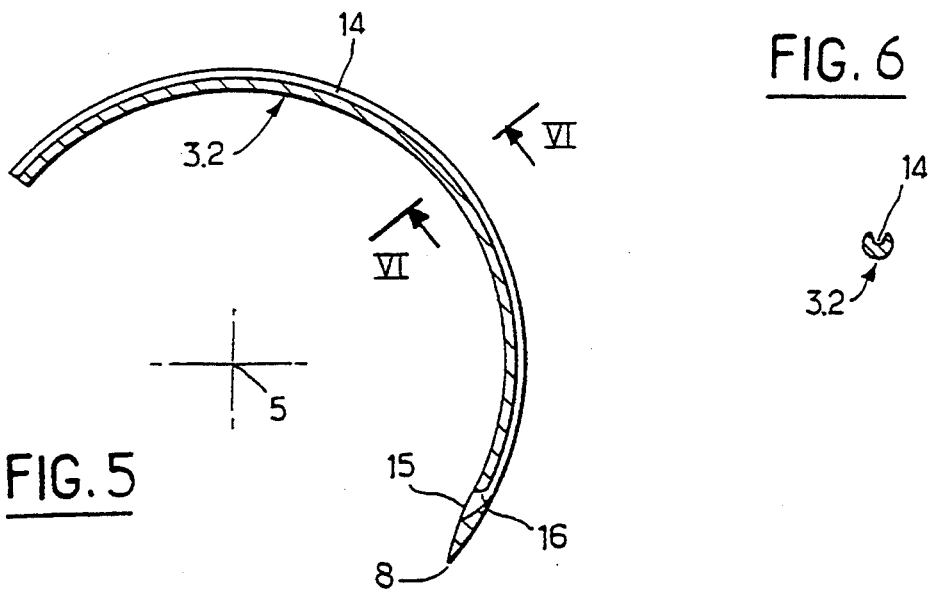
FIG. 5
FIG. 6

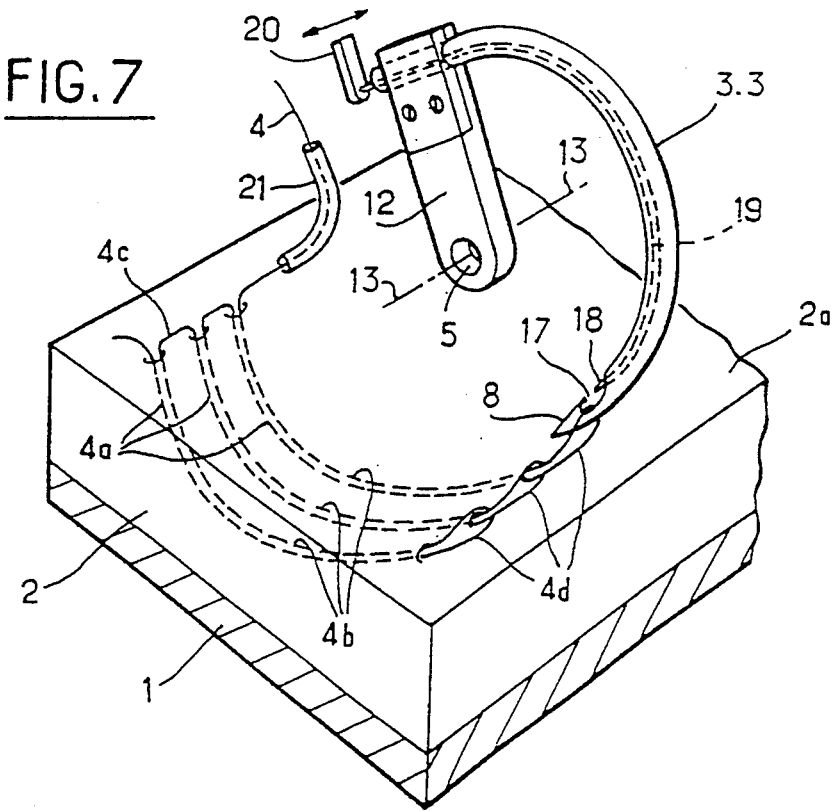
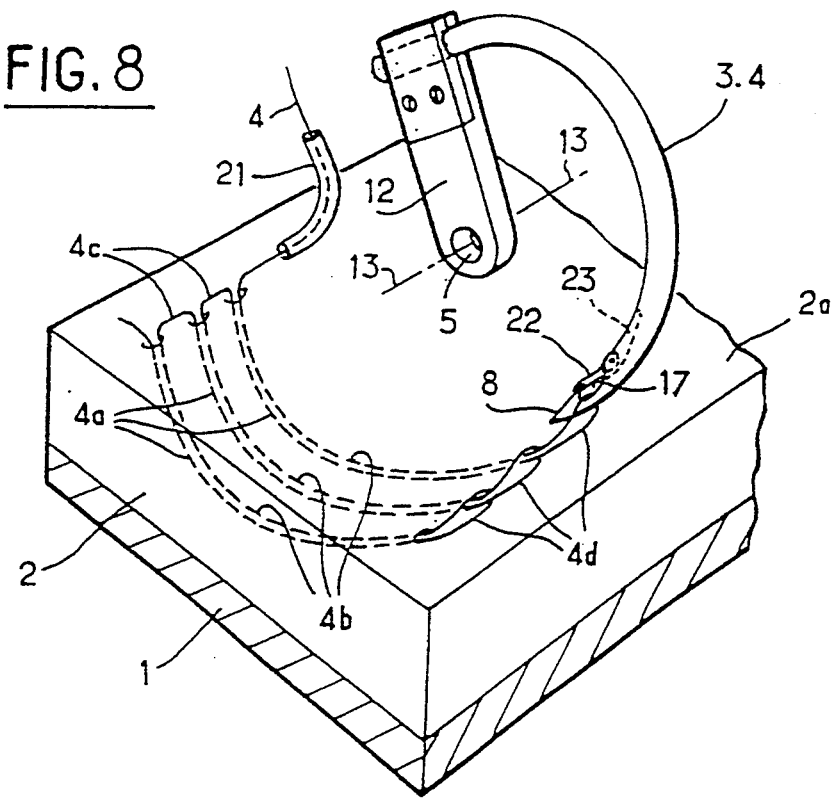

METHOD AND DEVICE FOR PRODUCING REINFORCEMENT ELEMENTS FORMED OF RESISTANT FIBERS

This is a continuation of U.S. application Ser. No. 07/788,587, filed Nov. 6, 1991, now abandoned; in turn a Div. of Ser. No. 07/646,094 filed Jan. 25, 1991, now U.S. Pat. No. 5,095,833.

BACKGROUND OF THE INVENTION

1. Field of the Invention

The present invention relates to a method and device for forming reinforcement elements composed of resistant fibers distributed along three dimensions. It also relates to the composite pieces obtained from said reinforcement elements after impregnation thereof with a hardenable binder, such as a synthetic resin.

2. Description of the Prior Art

From the American patents U.S. Pat. No. 2,283,802 and U.S. Pat. No. 3,322,868 a method is already known for example for forming composite elements from fibers distributed along three dimensions. In these known techniques, a substrate is formed from such fibers crossed in at least two directions, then the fibers of said substrate are bound together by stitching, by introducing a continuous fiber in said substrate using a needle driven with a reciprocal movement, whereas a relative movement of said needle with respect to said substrate occurs, so that said continuous fiber forms a zig-zag stitching line inside said substrate.

The use of such techniques raises no difficulty, when the two faces of the substrate are free, for then said needle may penetrate into said substrate by one of the faces and leave through the opposite face. On the other hand, when said substrate rests on a support, it is necessary to treat said support with special care.

For example, in the American patent U.S. Pat. No. 4,080,915 in which said support is rigid, openings are formed therein for allowing the end of the needle to penetrate therein without breaking. It will be noted that such a solution greatly limits the possibilities of stitching, since the number of openings formed in the support is necessarily limited and that it is imperative, for each stitch, for said needle to be opposite such an opening. Thus, in this prior patent, the openings are formed of elongate slits and the stitching lines are rectilinear, in correspondence with said slits. It can then be seen that not only the density of the stitches on the substrate must necessarily be low, but in addition, the form of the stitching lines and the distribution of the stitches are imposed once and for all by said openings.

On the other hand, in the American patent U.S. Pat. No. 4,863,660, the support is formed from a foam material or similar, allowing penetration of the point of a needle. In this case, there is no longer a limit imposed on the density of the stitches or the form of the stitching lines, but it is necessary to make the support from an easily destructible material, so as to be able to release the substrate from said support.

SUMMARY OF THE INVENTION

The object of the present invention is to overcome these drawbacks and make it possible to stitch a fiber substrate resting on a support without limiting the density of the stitches or the form of the stitching lines and without particular treatment of said support.

To this end, in accordance with the invention, the method for forming reinforcement elements from resistant fibers distributed along three dimensions, wherein, in a substrate resting on a support formed of such fibers crossed in at least two directions, a continuous fiber is introduced by stitching, from the free face of said substrate opposite said support by means of a needle driven with a reciprocal movement, a relative movement being in addition generated between said support and said needle so that said continuous fiber is formed inside said substrate of a succession of consecutive segments forming a zig-zag stitching line, is remarkable in that said needle is curved and imposes on each segment of said continuous fiber a similar curved form and in that the reciprocal movement of said curved needle occurs while rotating about an axis perpendicular to the plane of said needle and disposed on the concave side thereof. Preferably, said curved needle has a circular shape and said axis of rotation is coaxial with said needle.

Thus, with the invention, it is possible to cause said curved needle during its reciprocal movement, at the maximum, to come tangential to said support on which said substrate rests. Said curved needle does not then have to penetrate into said support to perform its stitching operation so that said support does not have to be specially treated for this purpose. The result is then in addition, that said needle may follow any desired path, as well as executing any desired density and distribution of stitches.

For example, during its reciprocal movement, said curved needle may come tangential to the face of said support on which said substrate rests. On the other hand, said curved needle may remain away from said support on which said substrate rests.

In addition, at the end of the outgoing stroke and at the beginning of the return stroke of said curved needle, the point thereof may project with respect to said free face of said substrate or else this point may be pricked inside said substrate.

Furthermore, the relative movement between said support and said needle may be rectilinear or curved. This relative movement between said support and said needle may be parallel to the plane of said needle. It may also be perpendicular to the plane of said needle.

In addition, the relative movement between said support and said needle may be inclined by an angle different from 90° with respect to the plane of said needle.

Generally, the relative movement between said support and said needle takes place so that the axis of rotation of said needle remains at a constant distance from said support. However, during the relative movement between said support and said needle, the axis of rotation of said needle may move away from or towards said support, for example to extract from said needle the amount of fiber required for forming a stitch.

The present invention also relates to a device for implementing the method.

For this, the device for forming reinforcement elements formed of resistant fibers distributed along three dimensions, which device comprises:
- a support on which a substrate rests formed of such fibers crossed in at least two directions;
- a needle capable of introducing a continuous fiber into said substrate, from the free face thereof opposite said support;
- means for driving said needle with a reciprocal movement; and means for generating a relative movement of said support with respect to said needle, is remarkable in that:

said needle is curved and guides said continuous fiber inside said substrate; and means are provided so that the needle is driven in reciprocal rotation about an axis perpendicular to the plane of said needle and disposed on a concave side thereof.

Said curved needle may comprise, for guiding said fiber, an internal channel opening, in the vicinity of the point of said needle, through a lateral eye. Preferably, said lateral eye is located in the concavity of said needle.

In a variant, said curved needle may comprise a thread guide groove along its convexity and a lateral eye in its concavity close to its point, said eye being in communication with said groove via a passage.

Said curved needle may also comprise, close to its point, a hook turned towards its concavity and which may be closed by a latch. Said latch may be controlled by a device or be controlled automatically by said fiber and by said substrate.

Advantageously, said needle is mounted in a needle-holder which is articulated, about said axis of rotation of the needle, on an arm which is movable with respect to said support. Preferably, a controllable thread clamp is mounted on said needle holder and said arm carries a reserve of fiber for said needle.

If necessary, said arm has in addition a mechanism for drawing the fiber when the needle exits between each stitch. Said arm may also carry a mechanism to form a loop when the point of said needle, after penetrating into said substrate, leaves again through the free side thereof.

Preferably, said arm is fixed to a machine capable of moving it with respect to the support. Such a support may be fixed; on the contrary, it may be formed by a rotary mandrel.

Thus, with the invention, a reinforcement element is obtained formed of resistant fibers distributed in three dimensions, said reinforcement element comprising a substrate formed of such fibers crossed in at least two directions and being remarkable in that it comprises curved fiber segments disposed in the thickness of said substrate.

From this reinforcement element, a composite piece may be produced by impregnating said element with a hardenable binder. The part thus obtained may as required be machined, at least on the surface, so as to obtain a final part.

BRIEF DESCRIPTION OF THE DRAWINGS

The figures of the accompanying drawings will better show how the invention may be put into practice. In these figures, identical references designate similar elements.

FIGS. 3a1, 3b1, 3c1 and 3d1 are diagrams illustrating different ways of implementing the method of the present invention.

FIGS. 3a2, 3b2, 3c2 and 3d2 are diagrams illustrating other ways of implementing the method according to the invention.

FIG. 4 shows, in a view similar to that of FIG. 1, a variant of the needle used in the method according to the invention.

FIG. 5 is a section, through its median plane, of the needle of FIG. 4.

FIG. 6 is a cross section of the needle of FIG. 4, through line VI—VI of FIG. 5.

FIGS. 7 and 8 show, in views similar to FIGS. 1 and 4, other variants of the needle used in the method according to the invention.

DESCRIPTION OF THE PREFERRED EMBODIMENT

Figure 1:
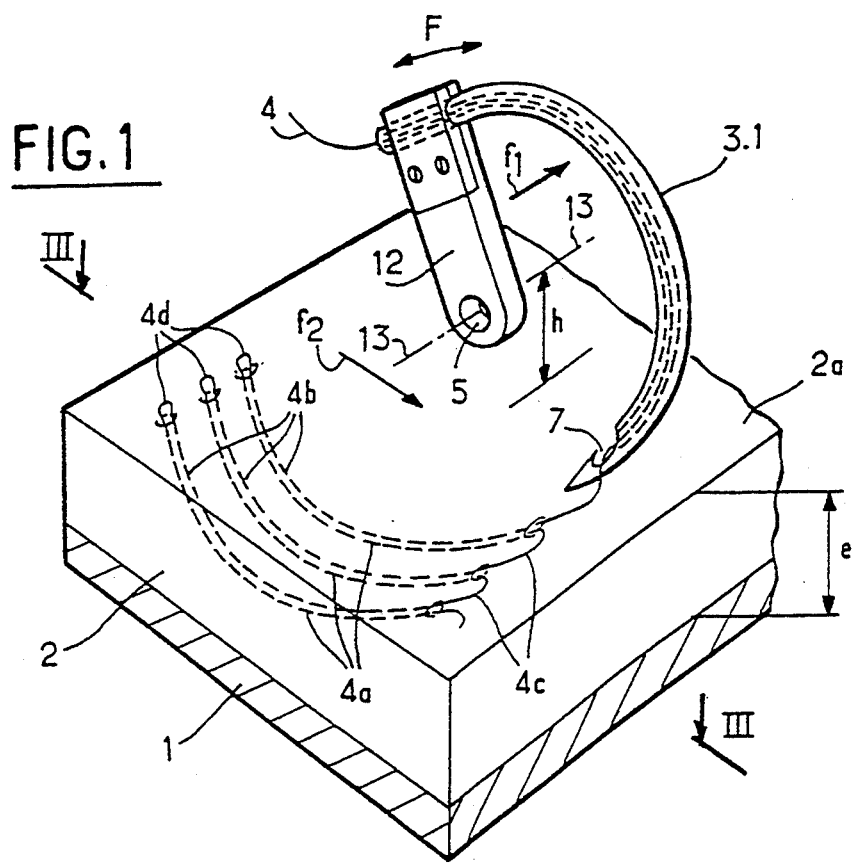
FIG. 1 is a schematic and partial perspective view illustrating the stitching method and device according to the invention, using a curved hollow needle through which the stitching fiber passes.

In FIG. 1, a support 1 has been shown on which rests a substrate 2 formed of resistant fibers, as well as a stitching needle 3.1 for introducing a fiber 4 inside said substrate 2.

Figure 15:
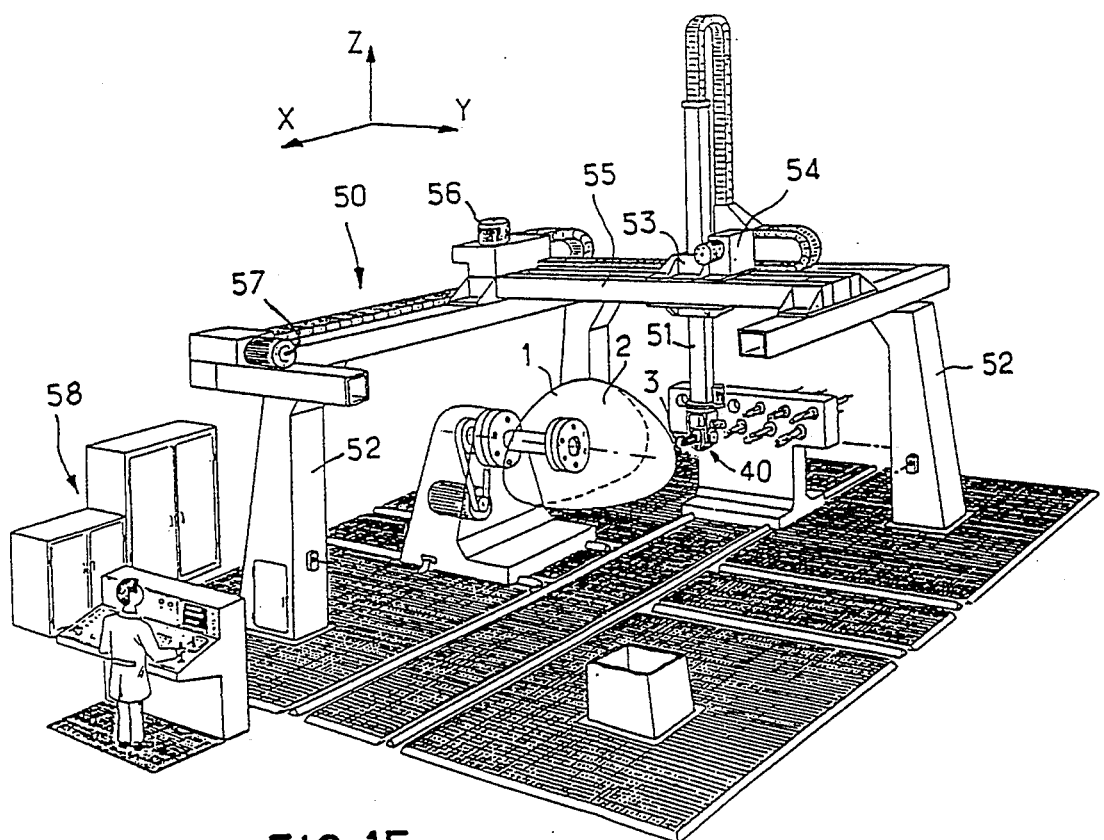
FIG. 15 shows in perspective a stitching machine incorporating the head of FIGS. 13 and 14.

Support 1 may be made from any desirable material, such as metal and may possibly be covered with a coating (not shown) for example of polytetrafluoroethylene. It may however also be made from a foam material, as is known in the technique. Depending on the form of the reinforcement element to be obtained, it may be formed by a simple plate (which is shown in FIG. 1) or else by a mandrel having a form of revolution and intended to be driven in rotation during the stitching operation (FIG. 15).

The resistant fiber substrate 2 may be of the two dimensional type, formed of fibers crossed in at least two directions. In this case, fiber 4 is intended to form the third dimension of this substrate. However, substrate 2 may also be of the three dimensional type and then fiber 4 is intended to form a reinforcement of the third dimension. Substrate 2 may be formed on support 1 or be formed elsewhere and brought to said support for there undergoing the curved stitching operations.

The resistant fibers forming substrate 2 and fiber 4 may be of different known kinds, such as glass, carbon, boron, KEVLAR (registered trademark), etc.

Figure 2:
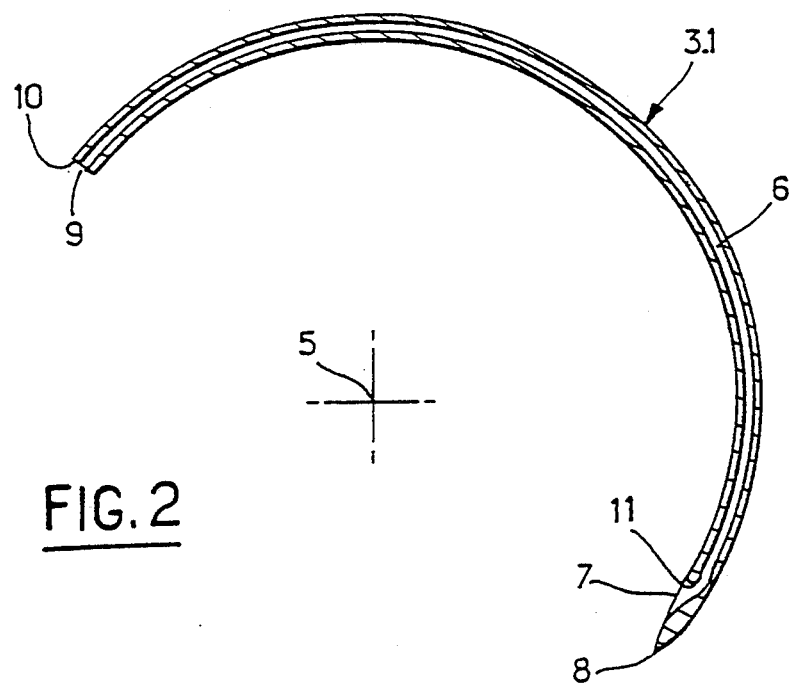
FIG. 2 is a section, through its median plane, of the hollow needle of FIG. 1.

As can also be seen in FIG. 2, needle 3.1 has a circular shape with center 5. It is hollow and has therethrough an internal channel 6 opening through a lateral eye 7, adjacent the point 8 of said needle and disposed in the concavity thereof. On the side opposite point 8, the internal channel 6 opens through an orifice 9. The fiber 4 is intended to pass through the internal channel 6, entering through orifice 9 and leaving through the lateral eye 7. In order to prevent damage and possibly breakage of the fiber 4 by rubbing against the walls of orifice 9 and the lateral eye 7, the internal channel 6 comprises a rounded widened portion 10 at said orifice 9, whereas an internal rounded bead 11 is provided on the edge of eye 7, opposite point 8.

The end of needle 3.1, opposite point 8, is fixed in a needle-holder 12, capable of being driven (see the double arrow F) with a reciprocal rotational movement about an axis 13—13 passing through the center 5 of needle 3.1 and at least substantially perpendicular to the plane thereof. Furthermore, a relative movement is generated between the support 1 and substrate 2 assembly, on the one hand, and needle 3.1, on the other.

If, as is shown in FIG. 1, this relative movement takes place in a direction f1 parallel to axis 13—13, it can be readily understood (possibly with the help of the complementary information given hereafter) that, on each outgoing stroke of needle 3.1 (clockwise rotation in FIG. 1), this needle introduces into substrate 2 a curved segment 4a of fiber 4 and that, at each of its return strokes (anti-clockwise rotation in FIG. 1), said needle 3.1 introduces into substrate 2 a curved segment 4b of said fiber 4, the segment 4b of a pair of segments 4a, 4b being connected to segment 4a of the following pair of segments 4a, 4b by a bridge 4c, parallel to axis 13—13, which is formed during the relative movement f1, whereas, on the side opposite bridges 4c, the two segments 4a and 4b of the same pair are joined together by a loop 4d.

In addition, depending on the radius of curvature of needle 3.1, and the height H of axis 13—13 above substrate 2 and on the thickness E of said substrate, numerous stitching configurations may be obtained. Some of them have been shown in FIGS. 3a1, 3b1 and 3c1, which correspond to schematic views along line III-—III of FIG. 1 and on which, for the sake of clarity, the segments 4a and 4b have been shown offset in the direction of the thickness of substrate 2.

For example, in FIG. 3a1, a stitching configuration has been shown in which the segments 4a and 4b are tangential to the face 1a of support 1 on which substrate 2 rests and loops 4d appear externally of the free face 2a of said substrate, through which needle 3.1 penetrates. Such a stitching configuration is advantageous when a support 1 is used in which needle 3.1 could not penetrate (metal support for example) and when it is desirable for segments 4a and 4b to form a reinforcement over the whole thickness of said substrate 2.

It goes however without saying that if support 1 were made from a material easily penetrated by needle 3.1, segments 4a and 4b could pass through at least the surface layer of said support. This is particularly advantageous when support 1 is made from a material which, in addition, is destructible after the reinforcement element has been produced.

In the example of FIG. 3b1, loops 4d are also outside substrate 2, on the same side as the free face 2a thereof, but segments 4a and 4b do not penetrate into said substrate 2 as far as the face 1a of support 1. In this case, segments 4a and 4b may form a surface reinforcement of substrate 2.

On the other hand, in the example of 3c1, loops 4d are formed inside substrate 2, for example at the level of the free face 1a of support 1, and are held in position by the pressure and friction exerted by the material of substrate 2. In FIG. 3d1, a first stitching operation is assumed to have taken place, similar to that of FIG. 3c1, then a second similar operation, symmetrical with the first one with respect to the plane passing through the axis 13—13 and orthogonal to support 1.

Instead of providing between support 1 and needle 3.1, as described above, a relative movement f1 parallel to axis 13—13, in FIGS. 3a2 to 3d2, a rectilinear movement has been illustrated parallel to a direction f2 perpendicular to said axis 13—13. This stitching method will moreover be described in detail, by way of example, with reference to FIGS. 10, 11 and 12a to 12f.

To each of the FIGS. 3a2 to 3d2 there correspond FIGS. 3a1 to 3d1, with identical index a, b, c, d. In this case, the bridges 4c, instead of being perpendicular to the plane of the drawings as in FIGS. 3a1 to 3d1 (the pairs of adjacent segments 4a and 4b being thus superimposed), are on the contrary parallel to the plane, of FIGS. 3a2 to 3d2, so that they are visible thereon and several pairs of consecutive segments 4a and 4b are also visible.

Of course, the relative movement of needle 3.1 with respect to support 1 does not necessarily take place in one of the directions f1 or f2. Such a relative movement could take place in any other direction, for example at 45° with respect to f1 and f2. In addition, it will be understood that this relative movement is not necessarily linear and that it may follow a curved path, such as circular, helical, spiralled, etc. or else a combination of such paths.

In FIGS. 4, 5 and 6 a first variant 3.2 of needle 3.1 has been shown. Needle 3.2 is also circular, with center 5. However, instead of being hollow it is solid and comprises a thread guide groove 14 along its convexity. On the same side as its point 8 it has an eye 15 turned towards its concavity and in communication through a passage 16 with said groove 14. It will be readily understood that needle 3.2 operates in a similar way to needle 3.1, fiber 4 being guided by groove 14 and through eye 15 (see FIG. 4) instead of being guided by the internal channel 6.

The second variant 3.3 of needle 3.1 shown in FIG. 7 is circular with center 5. On the same side as its point 8, it comprises a hook 17 turned towards its concavity and closable by a latch formed by the end of a circular rod 18 which may slide inside a channel 19 provided in said needle, under the action of a translation control device 20. Needle 3.3 operates in a way somewhat different from that of needle 3.1 and needle 3.2. With the latch of needle 3.3 closed, said needle is caused to pass through substrate 2 during its outgoing movement, and to leave again through the free face thereof. The latch opens and hook 17 grips the fiber 4, brought by an auxiliary device 21, after which said latch closes again and needle 3.3 pulls fiber 4 through said substrate during its return movement, thus forming simultaneously the segments 4a and 4b of a pair of segments, said fiber being gripped by hook 17 at the level of a loop 4d. When leaving surface 2a, needle 3.3 causes said loop 4d to project, after which a new cycle may begin again. Thus, a loop being formed is passed through the previously formed loop, so that loops 4d are joined together by a chain stitch. It will be noted that needle 3.3 requires the free face 2a of substrate 2 to be traversed at the end of the outgoing movement of said needle, so that it cannot provide stitching configurations as illustrated in FIGS. 3c1, 3d1, 3c2 and 3d2.

In the third variant 3.4 of needle 3.1, shown in FIG. 8, we have a latch needle operating similarly to needle 3.3. However, in this case, latch 22 is rotary and automatic, opening in the outgoing movements of the needle under the thrust of loop 4d which has just been formed, and being partially housed in housing 23 provided in the concavity of said needle. On the return stroke, the latch is swung into a closed position of hook 17 under the pressure of the material of substrate 2.

Figure 9:
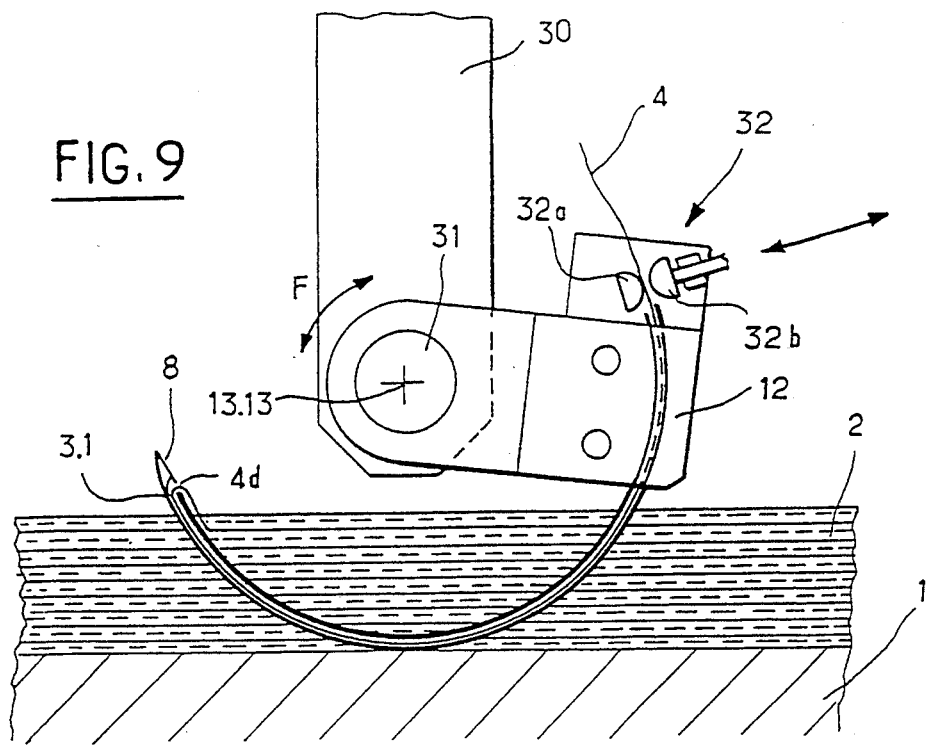
FIG. 9 shows, in a schematic and partial view, one embodiment of the device according to the invention.

In FIG. 9, the device of FIG. 1 has been shown in a front view, completing it. In this FIG. 9, an arm 30 has been shown which is fixed to displacement means not shown of a machine so as to be able to move with respect to support 1 and which has, at its end directed opposite said support 1, the needle-holder 12 mounted for pivoting about an axis 13—13 by an articulation 31. In addition, a thread clamp 32 is mounted on the needle-holder 12, on the same side as orifice 9 of needle 3.1, opposite point 8. For example, this thread clamp has a fixed part 32a and a movable part 32b, which is controllable away from or towards said part 32a, i.e. the fiber 4 which passes between the fixed and movable parts 32a and 32b may be free to pass therebetween or on the contrary be nipped therebetween.

Figure 10:
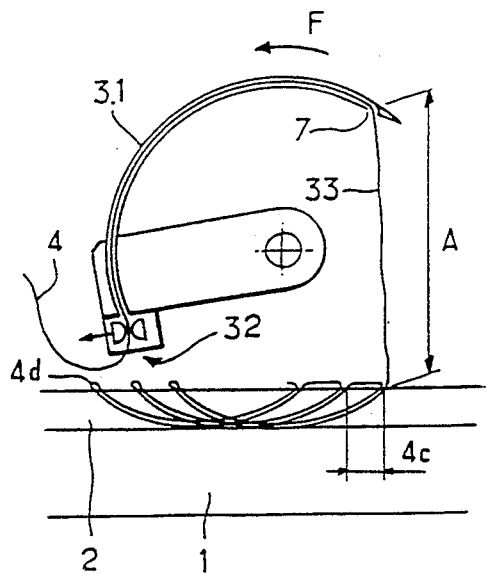
FIGS. 10 and 11 illustrate two ways of implementing the method according to the invention.
Figure 11:
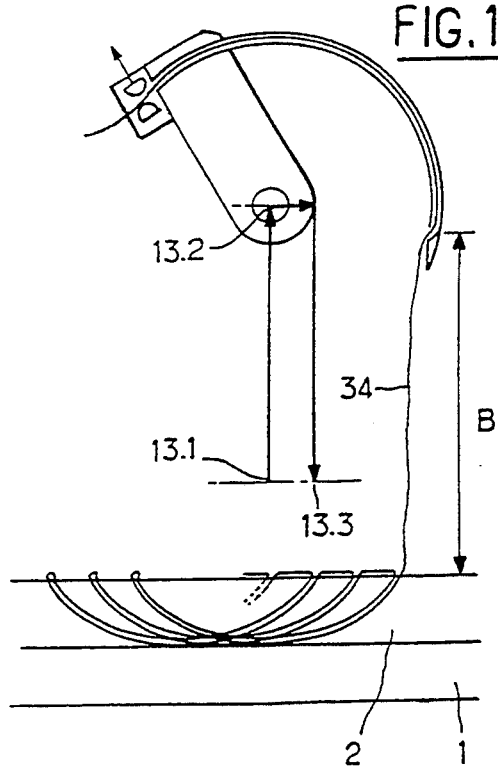

FIG. 10 illustrates one operating mode of the device of FIG. 9, mainly used for substrates 2 of small thickness. In this operating mode, at the end of the preceding stitch, with the thread clamp 32 open, needle 3.1 undergoes a return rotation about axis 13—13 of an amplitude A sufficient for the length 33 of fiber 4 leaving the needle and situated between eye 7 and substrate 2 to correspond to the sum of the lengths of bridge 4c, the curved segment 4a and loop 4d. After closing the thread clamp 32, bridge 4c and the curved segment 4a may then be formed by causing needle 3.1 to rotate about its axis 13—13, from this return position, in the direction of substrate 2. When needle 3.1 has arrived at the end of its stitching stroke, the thread clamp 32 is opened before the needle begins its return travel. Thus, during the return travel of needle 3.1, the curved segment 4b is formed, for example because of the friction which substrate 2 exerts on fiber 4. As will be seen hereafter, it would of course be possible, in the case where such friction is not sufficient, to use a member for retaining loop 4d.

In the operating mode variant illustrated in FIG. 1, arm 30 is moved orthogonally to support 1. Axis 13—13 may be brought from a first position 13.1 close to support 1 to a position 13.2 away from support 1 then to a second close up position 13.3. Thus, in this movement of axis 13—13 towards and away from substrate 2, associated with the return stroke of needle 3.1 about said axis 13—13, it is possible to obtain an amplitude of movement B sufficient to release from said needle, with the thread clamp 32 open, a length 34 of fiber 4 corresponding to the sum of the lengths of bridge 4c, segment 4a and loop 4d. This fiber length 34 is stitched into substrate 2, when the axis 13—13 occupies its close up position 13.3.

Figure 12A:
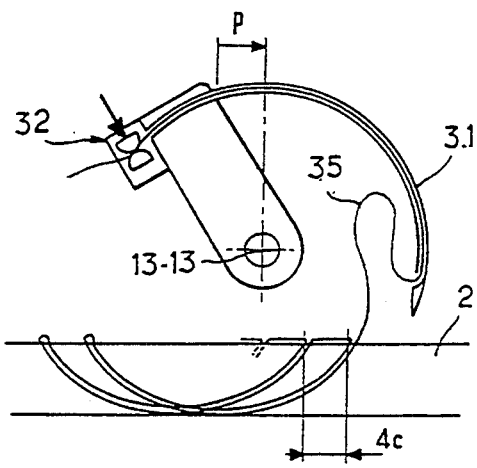
FIGS. 12a to 12f illustrate several steps of another way of implementing the method according to the invention.
Figure 12B:
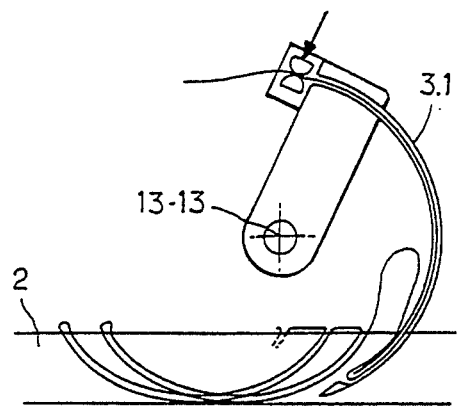
Figure 12C:
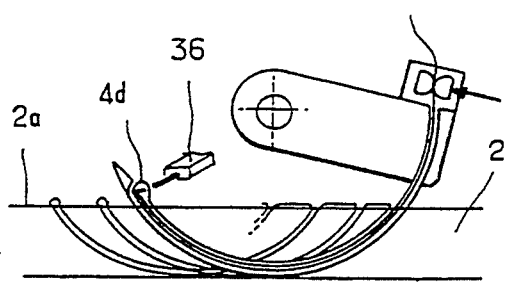
Figure 12D:
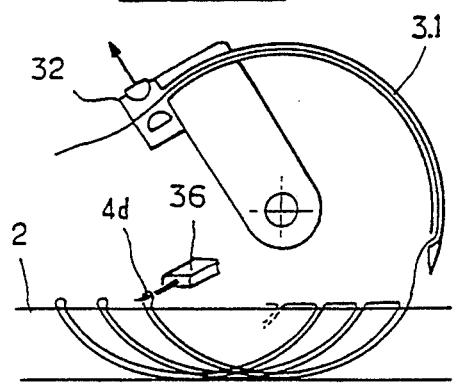
Figure 12E:
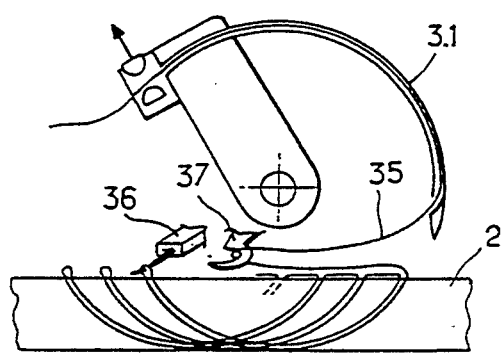
Figure 12F:
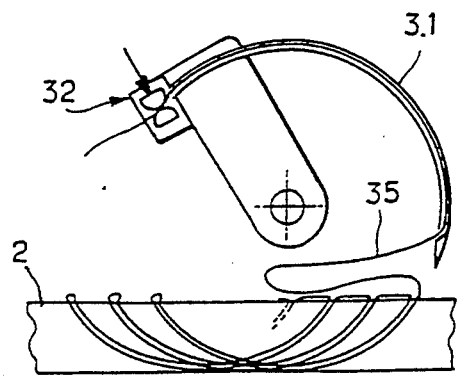

FIGS. 12a to 12f illustrate yet another operating mode. In FIG. 12a, needle 21 has just been moved by a step p, corresponding to bridge 4c, and an adequate length 35 of fiber 4 is available at the output of needle 3.1. In addition, the thread clamp 32 is closed. The stitching operation begins by rotating needle 3.1 (FIG. 12b) and continues until, after insertion of segment 4a, loop 4d appears on the face 2a (FIG. 12c). A retention member 36 grips loop 4d. The thread clamp 32 opens and needle 3.1 travels over its return stroke while rotating and forms segment 4b (FIG. 12d). At the end of the return stroke (FIG. 12e), a member 37 grips fiber 4 at the output of needle 3.1 so as to form the length 35. The thread clamp 32 closes again and members 36 and 37 are retracted and the device (see FIG. 12f) is ready to move by step p so as to take up the position illustrated in FIG. 12a. Another stitching cycle may begin.

Figure 14:
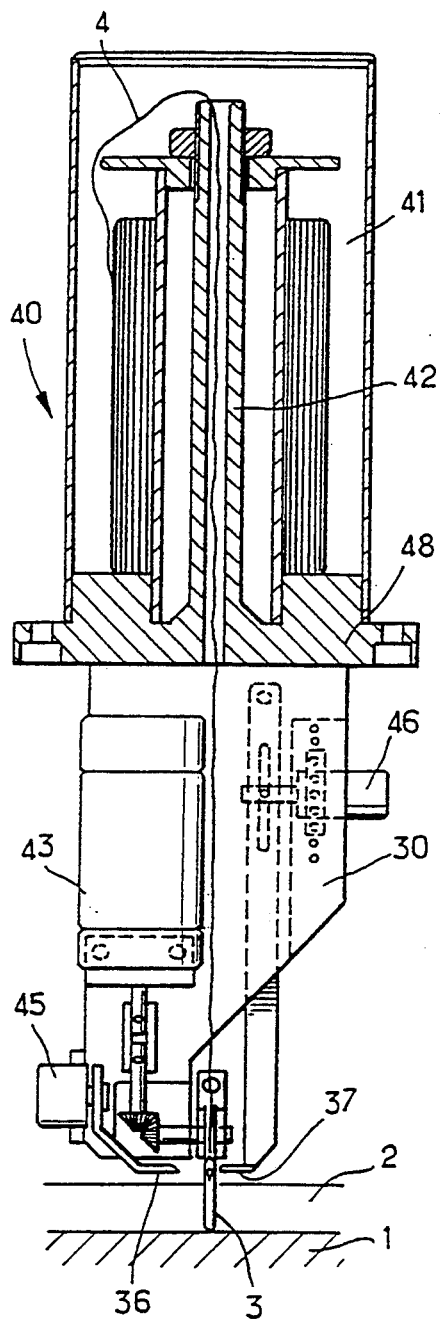
FIGS. 13 and 14 show, in elevation, in two perpendicular directions and in partial section, a device according to the invention in the form of a stitching head.
Figure 13:
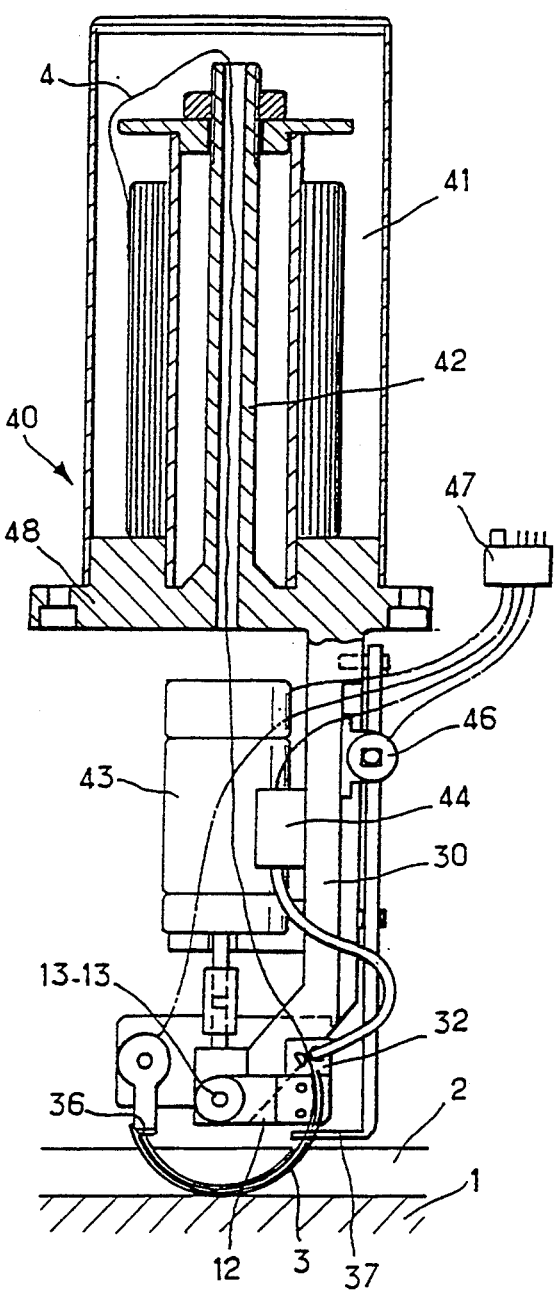

FIGS. 13 and 14 illustrate one embodiment of a stitching head 40 according to the invention. Arm 30 supports a reserve 41 of fiber 4 which is brought to needle 3 through a guide 42. Arm 30 carries in addition a motor 43 for actuating needle 3 in rotation about axis 13—13, a member 44 for actuating the loop retention member 36 and a member 46 for actuating the fiber gripping member 37. The various members and motor 43 to 46 are connected to control devices (not shown) by a connector 47. In addition, the stitching head 40 comprises a collar 48 for fixing to a stitching machine such as shown in FIG. 15.

The machine 50, shown in FIG. 15, comprises an arm 51 which may be moved along three dimensions X, Y and Z with respect to a frame 52. For this, arm 51 may be moved vertically along Z, with respect to a carriage 53, by means of a motor 54, whereas carriage 53 is mounted for movement along Y on a beam 55 by means of a motor 56 and said beam 55 is itself movable along X, with respect to frame 52, by means of a motor 57. The stitching head 40 is mounted at the lower end of arm 51 so as to be rotatable about each of axes X, Y and Z. In addition support 1, illustrated in FIG. 15 in the form of a rotary mandrel, carries substrate 2. From control station 58 the movement of head 40 with respect to substrate 2 and the different stitching operations of needle 3 in the substrate can be controlled.

It can thus be seen that with the invention reinforcement elements can be obtained comprising curved fibrous segments. Of course, support 1 may have any desired form and the direction of the stitching lines, not only with respect to support 1 but also with respect to the plane of needle 3 may be chosen depending on the result to be obtained. The same goes for the depth of stitching in substrate 2. Moreover, the stitching lines may be rectilinear, curved, circular, helical etc.

Figure 16:
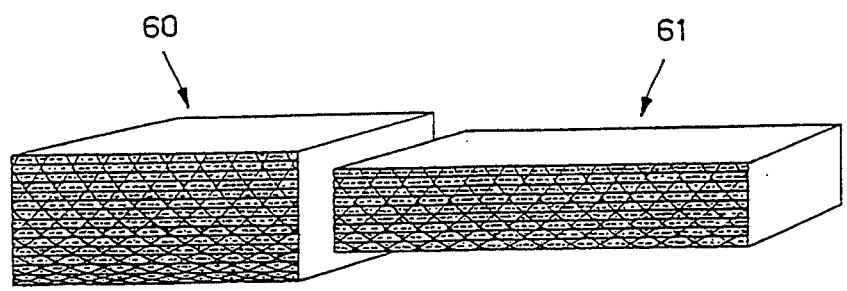
FIG. 16 illustrates the formation of a final composite part, by machining an undressed piece obtained by impregnating a reinforcement element formed in accordance with the invention with a hardenable binder

After obtaining such a reinforcement element, it is impregnated as is known with a hardenable binder so as to obtain a part 60 (see FIG. 16). If required, this part 60 is then machined, at least on the surface, so as to obtain the final part 61.

What is claimed is:

1. Reinforcement element formed of fibers distributed in three dimensions, said reinforcement element comprising a substrate formed of such fibers crossed in at least two directions, and including curved fiber segments disposed in the thickness of said substrate, said segments being produced by stitching a continuous fiber in said substrate.

2. Composite piece comprising a reinforcement element formed of fibers distributed in three dimensions and impregnated with a hardened binder, said reinforcement element comprising a substrate formed of such fibers crossed in at least two directions, and including curved fiber segments disposed in the thickness of said substrate, said segments being produced by stitching a continuous fiber in said substrate.

3. Composite piece as claimed in claim 2, which is machined, at least on the surface.

* * * * *

UNITED STATES PATENT AND TRADEMARK OFFICE
CERTIFICATE OF CORRECTION

PATENT NO. : 5,350,615

DATED : SEPTEMBER 27, 1994

INVENTOR(S) : JEAN-LOUIS DARRIEUX

It is certified that error appears in the above-identified patent and that said Letters Patent is hereby corrected as shown below:

On the title page:

Item: [73], the Assignee's name should read --AEROSPATIALE SOCIETE - NATIONALE INDUSTRIELLE--

Signed and Sealed this

Twenty-second Day of November, 1994

Attest:

BRUCE LEHMAN

*Attesting Officer*   *Commissioner of Patents and Trademarks*